(12) United States Patent
Ming

(10) Patent No.: US 7,823,797 B2
(45) Date of Patent: Nov. 2, 2010

(54) COLOR BARCODE PRODUCING, READING AND/OR REPRODUCING METHOD AND APPARATUS

(75) Inventor: Wei Ming, Cupertino, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 0 days.

(21) Appl. No.: 12/058,616

(22) Filed: Mar. 28, 2008

(65) Prior Publication Data

US 2008/0179407 A1    Jul. 31, 2008

Related U.S. Application Data

(62) Division of application No. 10/876,608, filed on Jun. 28, 2004.

(51) Int. Cl.
*G06K 19/06* (2006.01)
(52) U.S. Cl. ..................................... 235/494
(58) Field of Classification Search .................. 235/494
See application file for complete search history.

(56) References Cited

U.S. PATENT DOCUMENTS

| | | | |
|---|---|---|---|
| 5,016,214 A | 5/1991 | Laymoun | |
| 5,243,655 A | 9/1993 | Wang et al. | |
| 5,325,167 A | 6/1994 | Melen | |
| 5,337,362 A | 8/1994 | Gormish et al. | |
| 5,388,158 A | 2/1995 | Berson | |
| 5,486,686 A | 1/1996 | Zdybel, Jr. et al. | |
| 5,490,217 A | 2/1996 | Wang et al. | |
| 5,506,697 A | 4/1996 | Li et al. | |
| 5,544,045 A | 8/1996 | Garland et al. | |
| 5,576,528 A | 11/1996 | Chew et al. | |
| 5,606,609 A | 2/1997 | Houser et al. | |
| 5,612,524 A | 3/1997 | Sant' Anselmo et al. | |
| 5,671,282 A | 9/1997 | Wolff et al. | |
| 5,680,470 A | 10/1997 | Moussa et al. | |
| 5,734,800 A * | 3/1998 | Herbert et al. | ............... 358/1.9 |
| 5,754,697 A | 5/1998 | Fu et al. | |
| 5,760,382 A | 6/1998 | Li et al. | |
| 5,799,082 A | 8/1998 | Murphy et al. | |
| 5,862,270 A | 1/1999 | Lopresti et al. | |
| 5,905,800 A | 5/1999 | Moskowitz et al. | |
| 5,956,409 A | 9/1999 | Chan et al. | |

(Continued)

OTHER PUBLICATIONS

Adobe Acrobat, retrieved from http://en.wikipedia.org/wiki/Adobe_Acrobat on Dec. 19, 2008, 7 pages.

(Continued)

*Primary Examiner*—Seung H Lee
*Assistant Examiner*—Tae Kim
(74) *Attorney, Agent, or Firm*—Finnegan, Henderson, Farabow, Garrett & Dunner, LLP

(57) ABSTRACT

A color barcode can record much more amount of information than black white barcode. However, the problem of the color barcode is that it is easy to lose integrity or authenticity in printing and copy generation. This invention provides an apparatus and a method to keep the integrity or authenticity of the color barcode. Such is accomplished by the color information portion of the color barcode representing the color information about what colors are used for color tiles of data portion of the color barcode and an apparatus and a method for producing and reproducing such color barcode.

4 Claims, 4 Drawing Sheets

U.S. PATENT DOCUMENTS

| | | | |
|---|---|---|---|
| 5,987,153 | A | 11/1999 | Chan et al. |
| 6,035,406 | A | 3/2000 | Moussa et al. |
| 6,082,619 | A | 7/2000 | Ma et al. |
| 6,115,508 | A | 9/2000 | Lopresti et al. |
| 6,173,154 | B1 | 1/2001 | Kucinski et al. |
| 6,212,504 | B1 | 4/2001 | Hayosh |
| 6,285,775 | B1 | 9/2001 | Wu et al. |
| 6,320,982 | B1 | 11/2001 | Kurzweil et al. |
| 6,382,510 | B1 | 5/2002 | Ni |
| 6,418,244 | B2 | 7/2002 | Zhou et al. |
| 6,498,660 | B2 | 12/2002 | Haltmaier |
| 6,522,770 | B1 | 2/2003 | Seder et al. |
| 6,565,003 | B1 | 5/2003 | Ma |
| 6,567,530 | B1 | 5/2003 | Keronen et al. |
| 6,674,456 | B2 | 1/2004 | Miyazaki |
| 6,694,042 | B2 | 2/2004 | Seder et al. |
| 6,694,043 | B2 | 2/2004 | Seder et al. |
| 6,839,844 | B1 | 1/2005 | Okano |
| 6,917,724 | B2 | 7/2005 | Seder et al. |
| 7,020,327 | B2 * | 3/2006 | Tack-don et al. ............ 382/162 |
| 7,020,435 | B2 | 3/2006 | Moulthrop et al. |
| 7,032,823 | B2 | 4/2006 | Nojiri |
| 7,040,539 | B1 | 5/2006 | Stover |
| 7,088,857 | B2 | 8/2006 | Zuniga |
| 7,118,041 | B2 | 10/2006 | Taylor |
| 7,166,347 | B2 | 1/2007 | Inoue et al. |
| 7,185,816 | B1 | 3/2007 | Shoobridge |
| 7,197,644 | B2 | 3/2007 | Brewington |
| 7,523,865 | B2 | 4/2009 | Tomita |
| 7,533,817 | B2 | 5/2009 | Ming et al. |
| 2002/0110798 | A1 | 8/2002 | Kucinski et al. |
| 2002/0164053 | A1 | 11/2002 | Seder et al. |
| 2002/0181736 | A1 | 12/2002 | Seder et al. |
| 2002/0181737 | A1 | 12/2002 | Seder et al. |
| 2003/0120930 | A1 | 6/2003 | Simpson et al. |
| 2004/0003255 | A1 | 1/2004 | Apvrille et al. |
| 2004/0027601 | A1 | 2/2004 | Ito et al. |
| 2004/0185424 | A1 | 9/2004 | Kucinski et al. |
| 2004/0202386 | A1 | 10/2004 | Quine |
| 2005/0111867 | A1 | 5/2005 | Hatano |
| 2005/0132194 | A1 | 6/2005 | Ward |
| 2005/0259876 | A1 | 11/2005 | Ogawa |
| 2006/0017802 | A1 | 1/2006 | Yoo et al. |
| 2006/0034505 | A1 | 2/2006 | Luk-Pat et al. |
| 2006/0056735 | A1 | 3/2006 | De Haan |
| 2006/0124744 | A1 | 6/2006 | Gormish et al. |
| 2007/0022053 | A1 | 1/2007 | Waserstein et al. |
| 2007/0036371 | A1 | 2/2007 | Buil et al. |
| 2007/0139710 | A1 | 6/2007 | Ohta |
| 2007/0176000 | A1 | 8/2007 | Cattrone et al. |
| 2007/0176001 | A1 | 8/2007 | Cattrone et al. |
| 2007/0211310 | A1 | 9/2007 | Kadota |
| 2007/0229915 | A1 | 10/2007 | Iida |
| 2007/0241554 | A1 | 10/2007 | Wicker et al. |
| 2008/0048044 | A1 | 2/2008 | Zhao et al. |
| 2008/0080777 | A1 | 4/2008 | Tomita |
| 2008/0114927 | A1 | 5/2008 | Yao et al. |
| 2008/0173718 | A1 | 7/2008 | Ibe |
| 2008/0216004 | A1 | 9/2008 | Cheng et al. |
| 2009/0031135 | A1 | 1/2009 | Kothandaraman |

OTHER PUBLICATIONS

Adobe Photoshop, retrieved from http://en.wikipedia.org/wiki/Adobe_Photoshop on Jan. 3, 2009, 6 pages.
Adobe® 6.0 Acrobat® Curriculum Guide, Adobe, 2003, lessons 3-5, 27 pages.
Altavion, First Amended Complaint, pleading, Dec. 15, 2008, pp. 43, San Mateo County Superior Court, USA.
Konica/Minolta, Cross Complaint, pleading, Oct. 27, 2008, pp. 13, San Mateo County Superior Court, USA.
Altavion, Inc., Complaint, pleading, Nov. 9, 2007, pp. 26, San Mateo County Superior Court, USA.
Antognini, T., A Flexibly Configurable 2D Bar Code, white paper based on paper delivered to the Information Based Indicia Program Technology Symposium, sponsored by the US Postal Service, Nov. 25-26, 1996, 24 pages.
Barcode Introduction: PDF417 Symbology, Barcode Technology Online, retrieved from http://www.barcodecontrols.com/PDF417.html on Dec. 19, 2008, 5 pages, EaseSoft Inc.
Computer Dictionary, The Comprehensive Standard for Business, School, Library, and Home, 1994, pp. 106 and 146, Second Edition, Microsoft Press.
Conrad, E., Explanation of the Three Types of Cryptosystems—GIAC Research in the Common Body of Knowledge, Feb. 6, 2007, retrieved from http://www.giac.org/resources/whitepaper/cryptography/52.php (1 of 5) on Dec. 3, 2008, 5 pages.
Data Compression, retrieved from http://en.wikipedia.org/wiki/Data_compression on Dec. 2, 2008, 6 pages.
Data matrix (computer), retrieved from http://en.wikipedia.org/wiki/Data_matrix_(computer) on Dec. 19, 2008, 4 pages.
DataGlyphs® Frequently Asked Questions (FAQ), Palo Alto Research Center Incorporated, retrieved from http://www.parc.com/research/projects/dataglyphs/faq.html on Dec. 18, 2008, 10 pages.
Definitions, Encryption, SearchSecurity.com (powered by WhatIs.com), retrieved from http://searchsecurity.techtarget.com/sDefinition/0,,sid14_gci212062,00.html on Dec. 2, 2008, 4 pages, TechTarget.
Encryption Algorithms, retrieved from http://www.mycrypto.net/encryption/crypto_algorithms.html on Dec. 2, 2008, 3 pages.
Encryption, retrieved from http://en.wikipedia.org/wiki/Encryption on Dec. 2, 2008, 2 pages.
Firth, P. Using Barcodes in Documents—Best Practices, Pegasus Imaging Corporation, 2007, 9 pages.
Gengler, B., Adobe Integrates Secures PDF with XML—Business Software—IT Business Special Report, retrieved from http://www.identrust.com/company/press_releases/2004/release_040615.html on Dec. 1, 2008, dated Jun. 14, 2004, 2 pages, press release in The Australian.
Goebel, G., Data Compression, In The Public Domain, Mar. 1, 2007, v1.2./TOC (3 chapters) Public Domain, retrieved from http://www.vectorsite.net/ttdcmp.html on Dec. 2, 2008, 2 pages.
McDaniel, G., IBM Dictionary of Computing, Aug. 1993, pp. 129 and 235, Tenth Edition, McGraw-Hill, Inc.
McGraw-Hill Dictionary of Scientific and Technical Terms, 2003, p. 548, Sixth Edition, McGraw-Hill.
Pretty Good Privacy, retrieved from http://en.wikipedia.org/wiki/Pretty_Good_Privacy on Dec. 11, 2008, 9 pages.
Product Reviews: Design/DTP—Acrobat 4, PC PRO Computing in the Real World, Apr. 2000, Issue 58, retrieved from http://www.pcpro.co.uk/reviews/79/acrobat-4.html on Jan. 14, 2009, 2 pages.
QR Code Barcode (Quick Response Barcode), TechnoRiver, retrieved from http://www.technoriversoft.com/QRCODEBarcode.html on Dec. 18, 2008, 2 pages.
Resnick, P., Standards Track—Internet Message Format, Oct. 2008, 57 pages, The IETF Trust.
Sci-Tech Encyclopedia: Data Compression, 2008, retrieved from http://www.answers.com/topic/data-compression on Dec. 2, 2008, 12 pages.
Sedgewick, J. Image Stitching Using Photoshop, 2003, 4 pages.
The American Heritage Dictionary of the English Language, 2006, p. 44, 4th edition, Houghton Mifflin Company.
Tutorial: 1. Introduction to image slicing, How to slice an image, Mar. 22, 2002, 5 pages, Elated Communications Ltd.
Altavion, Second Amended Complaint, May 22, 2009, (49 pages), San Mateo County Superior Court, USA.
Altavion, Notice of Entry on Order Sustaining Defendant's Demurrer to Plaintiff Altavion's Second Amended Complaint, including Exhibit A, Sep. 28, 2009, (7 pages), San Mateo County Superior Court, USA.
Altavion, Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (3 pages), San Mateo County Superior Court, USA.

Altavion, Memorandum of Points and Authorities in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (20 pages), San Mateo County Superior Court, USA.

Altavion, Request for Judicial Notice of Support of Defendants' Demurrer to Altavion's Second Amended Complaint, Jun. 23, 2009, (3 pages), San Mateo County Superior Court, USA.

Altavion, Declaration of Laura R. Mason in Support of Konica Minolta's Systems Laboratory, Inc.'s, Konica Minolta Business Solutions, U.S.A., Inc.'s, Konica Minolta Business Technologies, Inc.'s and Paul Catrone's Notice of Demurrer and Demurrer to Altavion, Inc.'s Second Amended Complaint, Jun. 23, 2009, (2 pages), San Mateo County Superior Court, USA.

Altavion, Reply Brief in Support of Defendants' Demurrer to Altavion Inc.'s Second Amended Complaint, Aug. 20, 2009, (15 pages), San Mateo County Superior Court, USA.

Attachment I, Facts Supporting Plaintiffs Claims 4-7 Which are Separate from Plaintiffs Trade Secret Claim 1 [Redacted Portions Filed Under Seal], bearing Aug. 13, 2009 on its face, (6 pages), San Mateo County Superior Court, USA.

Specifications for Popular 2D Bar Codes, Bar Code 1: A Web of Information About Bar Code 2-Dimensional Bar Code Page, retrieved from http://www.adams1.com/stack.html on Dec. 2, 2008, 9 pages.

Office Action dated Aug. 5, 2008, in related U.S. Appl. No. 10/876,608, filed Jun. 28, 2004, Ming et al.

Office Action dated Feb. 18, 2009, in related U.S. Appl. No. 10/876,608, filed Jun. 28, 2004, Ming et al.

Office Action dated Jun. 24, 2009, in related U.S. Appl. No. 10/876,608, filed Jun. 28, 2004, Ming et al.

Office Action dated May 21, 2010, in related U.S. Appl. No. 10/876,608, filed Jun. 28, 2004, Ming et al.

Office Action dated Jan. 21, 2009, in related U.S. Appl. No. 12/058,630, filed Mar. 28, 2008, Ming et al.

Office Action dated Sep. 4, 2009, in related U.S. Appl. No. 12/058,630, filed Mar. 28, 2008, Ming et al.

Office Action dated Jun. 12, 2007, in U.S. Appl. No. 10/913,347, filed Aug. 4, 2004, Ming et al.

Office Action dated Feb. 25, 2008, in U.S. Appl. No. 10/913,347, filed Aug. 4, 2004, Ming et al.

Office Action dated Sep. 3, 2008, in U.S. Appl. No. 10/913,347, filed Aug. 4, 2004, Ming et al.

Notice of Allowance dated Jan. 8, 2009, issued in U.S. Appl. No. 10/913,347, filed Aug. 4, 2004, Ming et al.

\* cited by examiner

COLOR BARCODE PRODUCING, READING AND/OR REPRODUCING METHOD AND APPARATUS

This is a divisional application of application Ser. No. 10/876,608, filed Jun. 28, 2004, which is incorporated herein by reference in its entirety.

BACKGROUND OF THE INVENTION

The present invention relates to a color barcode producing method and apparatus, a color barcode reading method and apparatus and a color barcode reproducing method and apparatus.

A black and white barcode is very widely used for recording digital information which is readable by an apparatus in a small space on a printed matter. However, such black and white barcode has some problems. One of the problems is that it is difficult to record information including large data such as a long document or a picture.

Recently, to solve such problem, a color barcode using several colors is developed. The color barcode can record much more information than the black and white barcode because while the black and white barcode records information by binary recording, the color barcode using several colors can record information by multivalued recording.

However, even if user uses the color barcode, there are some problems yet. The problem is that the color barcode is easy to loss its integrity and authenticity in printing and copy generation due to i) different color management system of different apparatus, ii) different printer, iii) unstable color characteristic of printer itself, iv) scanner precision, v) degradation of color on a printed matter with time and vi) degradation in copy generation, and so on.

SUMMARY OF THE INVENTION

With a background stated above, an object of the invention is to provide a method or an apparatus which is able to maintain integrity and authenticity of the color barcode in printing and copy generation.

In order to achieve the above object, according to one aspect of the present invention, a method for producing a color barcode comprises a color information encrypting step which encrypts a color information which describes what color is used for color tiles of the color barcode, a color information portion producing step which produces a color information portion which is a part of the color barcode and represents the color information according to the result of the encrypting step of the color information, a data encrypting step which encrypts data, a data portion producing step which produces a data portion which is a part of the color barcode, includes the several color tiles in which colors represented by the color information are assigned and represents a data, according to the color information and the result of the encrypting step of the data, and a printing step which prints the color barcode including the color information portion and the data portion according to the results of the two producing steps.

DETAILED DESCRIPTION OF THE PREFERRED EMBODIMENT

Figure 1:
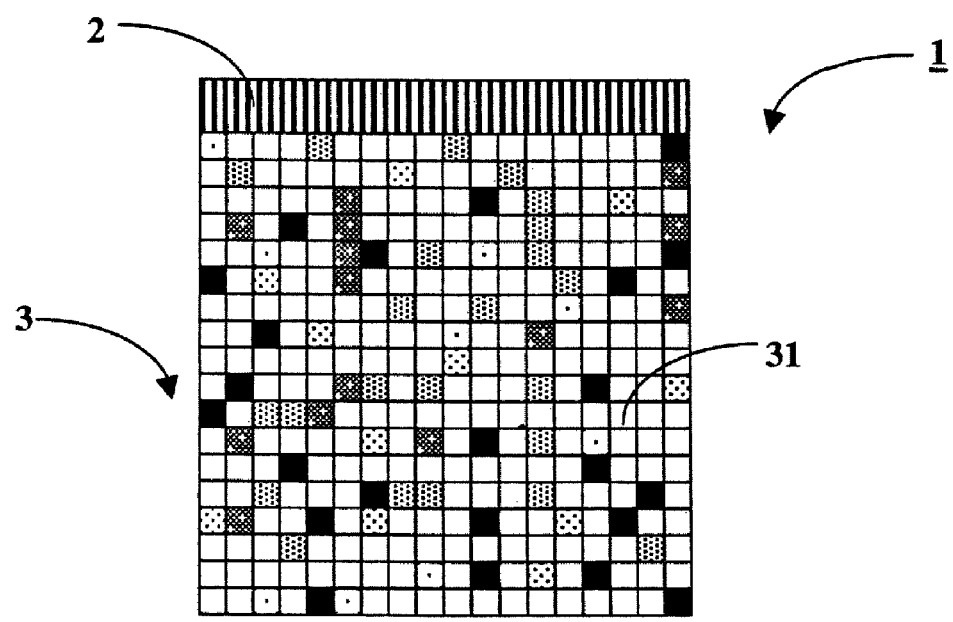
FIG. 1 is a view of a color barcode as one of embodiment of the present invention.

In the following, the detailed description and some of the embodiments of this invention will be explained, referring to the drawings.

As shown in FIG. 1, a color barcode 1 comprises a color information portion 2 and a data portion 3 including several color tiles 31.

A color information portion 2 is a part of the color barcode 1 and represents a color information. The color information includes information about what kind color is used for color tiles 31 of the data portion 3 of the color barcode 1. As the color information, a digital information may be used. Further, as the color information, a defined color value may be used. As the defined color value, Pantone™ color, LAB value (La*b* value or Lab value), HSV and so on may be used. In other words, the color information may include information about what Pantone™ color, LAB value or HSV is used for the color tiles 31. Other defined color value may be included in the color information. It is preferably that Pantone™ color is included in the color information, because difference of color printed in documents by various printers is small when Pantone™ color is used. Pantone™ color is color of definition defined by Pantone, Inc as of June, 2004. For example, the color information portion 2 may record information that red (Pantone™ 485 C), orange (Pantone™ 715 C), blue (Pantone™ 285 C), green (Pantone™ 340 C), yellow (Pantone™ 102 C) and pink (Pantone™ 672 C) are used for the color tiles 31. Further, among many Pantone™ colors, the Pantone™ colors which can be recognized by many printers and color copying machines may be used for the color barcode.

The color information portion 2 may be a header of the color barcode 1 preferably. Or, the color information portion 2 may be a footer or other part of the color barcode 1.

The color information portion 2 may be black and white, grayscale or other color. To prevent to lose integrity and authenticity, black and white or grayscale may be used for the color information portion 2. To prevent the color barcode 1 from outstanding in the color document, colored color information portion may be used.

In the case that colored color information portion is used, the color information portion 2 may represent a color information of the color information portion 2 itself as well as the color information of the color tiles 31 of the data portion 3. The color information of the color information portion includes information about what color (such as Pantone™ color, LAB value and so on) is used for the color information portion.

The color information portion 2 may be one-dimensional barcode or two-dimensional barcode. If data amount of the color information is not so large, the color information portion 2 may be one-dimensional barcode.

The color information portion 2 is produced based on a result of an encryption of the color information. Detailed explanation is described later.

The data portion 3 is a part of the color barcode 1, includes the several color tiles 31 and represents a data. Several color tiles 31 include several colors other than black, white and gray. If Pantone™ color, LAB value, LAB value or HSV is different, the color is different. The colors (such as Pantone™ colors, LAB colors and so on) represented by the color information portion 2 are assigned to the color tiles 31. Although the colors assigned to the color tiles 31 include colors other than black, white and gray, the colors assigned to the color tiles 31 also may include black, white or gray. The shape of the color tile is not limited and may be square, circle, line and so on. All of the shape of the color tile may be the same. Or, color tiles of different shape may be included in one data portion. For example, the data portion 3 records information about contents of a certain document or contents of a certain picture. Because the data portion 3 uses several colored tiles 31 for recording information, the data portion 3 records information by multivalued recording, not by binary recording, and can record large volume data in small space. Any number of colors may be assigned to the color tiles. Number of colors used as the color tiles may be multiplier of two. Also, number of colors used as the color tiles may less than 100.

The data portion 3 may be two-dimensional barcode using several color tiles 31. QR Code™, PDF417, Data Matrix™, Maxi Code and so on can be used as two-dimensional barcode.

The data portion 3 is produced based on a result of an encryption of the data. For example, the content of document or picture to be affixed by the color barcode is encrypted as data. In the case, if someone amends the document or picture, the fact that the document of picture was amended can be detected by comparing the encrypted data in the data portion of the color barcode and the amended content of document or picture.

As shown in FIG. 1, the color information portion may be located near the data portion. That is, the distance between the color information portion and the data portion may be same as or less than 1 cm. Alternatively, the distance between the color information portion and the data portion may be more than 1 cm. Further, in the case that number of pages of one document is not less than two, the color information portion may be located on the page which is different page on which the data portion is located. The color information portion may be located on only one page of the document and the data portion may be located on the several pages of the document.

The data portion or other portion of the color barcode located near (1 cm or less) the data portion may include information about where the color information portion is. On the contrary, the color information portion may include information about where the data portion is.

To read the data of data portion 3, the color barcode 1 on the document is scanned by a color barcode reader including decryption program, the data of the data portion 3 is decrypted and the data recorded in the data portion 3 can be obtained.

Example 1

Next, one example of an apparatus for producing the color barcode will be explained as follows. Incidentally, in all of following examples, information about what kind of Pantone™ color is used for the color tiles is included in the color information.

A color barcode producing apparatus comprises a color information portion producing device, a data portion producing device and a printing device.

As such color barcode producing apparatus, a color printer, such as a laser beam color printer, a thermal color printer such as a sublimation color printer or an ink jet color printer, or a color multi function printer including copying function may be used. In such embodiments, all of the color information portion producing device, a data portion producing device and a printing device are contained in one unit.

On the other hand, as such color barcode producing apparatus, a system including several units connected with each other with or without wire, such as a system including a personal computer and a color printer which are apart and are connected with each other, may be used. The color printer may be a laser beam color printer, a thermal color printer such as a sublimation color printer or an ink jet color printer, or a color multi function printer including copying function.

Next, each element of the color barcode producing apparatus is explained as follows.

The color information portion producing device of the color barcode producing apparatus encrypts the color information for the color barcode and produces the color information portion of the color barcode according to the result of the encryption of the color information. As the color information portion producing device, in the case that the color barcode producing apparatus is a color printer or a color copying machine, an IC (integrated circuit) or a CPU (central processing unit) may be comprised, if necessary in combination with a software. As the color information portion producing device, in the case that the color barcode producing apparatus is a system including a computer and a color printer or a color copying machine apart, an IC or a CPU of the computer may be comprised, if necessary in combination with a software.

The data portion producing device of the color barcode producing apparatus encrypts data which will be recorded into the color barcode and produces the data portion according to the color information and the result of the encryption of the data. As the data portion producing device, in the case that the color barcode producing apparatus is a color printer or a color copying machine, an IC or a CPU of the color printer or the color copying machine may be comprised, if necessary in combination with a software. As the data portion producing device, in the case that the color barcode producing apparatus is a system including a computer and a color printer apart, an IC or a CPU of the computer may be comprised, if necessary in combination with a software.

The printing device of the color barcode producing apparatus prints the color barcode including the color information portion and the data portion according to the results of the producing step of the color information portion producing device and the producing step of the data portion producing device. As the printing device, in the case that the color barcode producing apparatus is a color printer or a color copying machine, a printing portion of the color printer may be comprised. As the printing device, in the case that the color barcode producing apparatus is a system including a computer and a color printer apart, the color printer may be comprised.

Using the color barcode producing apparatus of this example, the color barcode is produced as follows.

A method for producing a color barcode comprises a color information encrypting step which encrypts the color information, a color information portion producing step which produces a color information portion according to the result of the encrypting step of the color information, an data encrypting step which encrypts data, a data portion producing step which produces a data portion according to the color information and the result of the encrypting step of the data, and a printing step which prints the color barcode including the color information portion and the data portion according to the results of the color information portion producing step and the data portion producing step. In the case that the color information portion of the color barcode is not fixed and alters at every produce of the color barcode, the above method may be applied.

In the following, the detailed description of one of embodiments of the above method will be explained, referring to FIG. 2.

Figure 2:
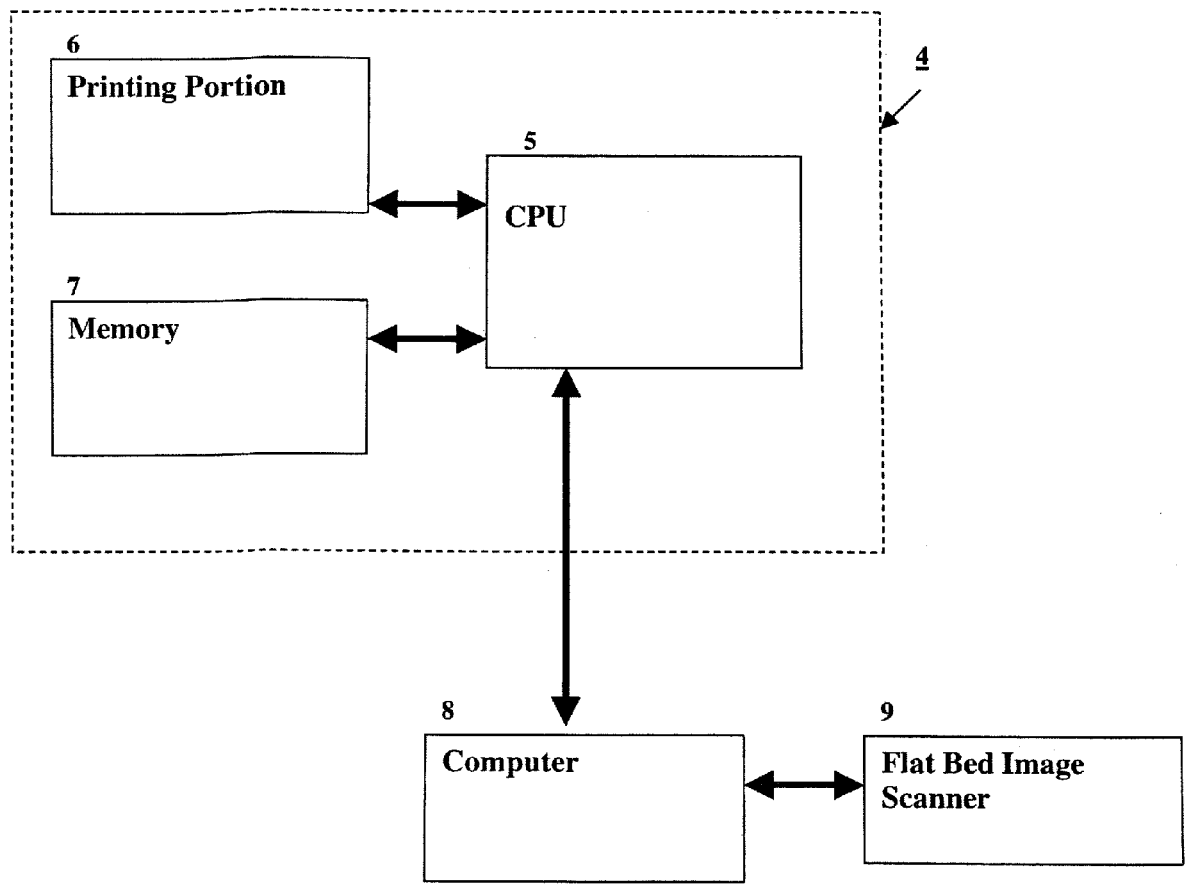
FIG. 2 is a block diagram of a color barcode producing apparatus as one of embodiment of the present invention.

In FIG. 2, a color printer 4 is shown as the color barcode producing apparatus for the above method. In this embodiment, a computer 8 is connected with the color printer 4. The computer 8 is connected with a flat bed image scanner 9.

At first, a document or a picture including information which is to be recorded in the data portion of the color barcode is scanned by the flat bed image scanner 9 and is changed into a digital data which is a base of the data portion 3 of the color barcode 1. Alternatively, to get a digital data which is a base of the data portion 3, some digital data, such as a data recorded in CD-ROM, DVD-ROM or a hard disk or a digital data sent via a network, may be read by the computer 8.

Next, colors to be assigned to the color tiles 31 of the data portion 3 is decided. To decide the colors, a document on which the color barcode is affixed is scanned by the flat bed image scanner 9 or read by the computer 8. And the data of the document, which may be the digital data being a base of the data portion, is analyzed by the computer 8 or the CPU 5 of the color printer 4. Then, the shade or tone of colors of the data of the document is decided by the computer 8 or the CPU 5 of the color printer 4, and the colors to be assigned to the color tiles 31 are decided by the computer 8 or the CPU 5 of the color printer 4 so as that the colors to be assigned to the color tiles 31 are harmonious with the colors of the document affixing the color barcode. The colors to be assigned to the color tiles 31 are decided as the Pantone™ colors. Each Pantone™ color to be selected may be stored in the computer 8 or a memory 7 of the color printer 4.

Alternatively, the number of colors to be assigned to the color tiles may be decided according to the volume of data to be recorded in the data portion. That is, if the volume of data is large, the number of colors assigned to color tiles is many. On the contrary, if the volume of data is small, the number of colors may be few.

In contrast, the number of colors to be assigned to the color tiles may be always fixed.

Instead of the above, the colors to be assigned to the color tiles may be decided at random regardless of the document.

By deciding the colors assigned to the color tiles 31, the color information is decided. That is to say, what Pantone™ colors are used for color tiles 31 of the data portion 3 of the color barcode 1 is decided. In this example, six colors, red (Pantone™ 485 C), orange (Pantone™ 715 C), blue (Pantone™ 285 C), green (Pantone™ 340 C), yellow (Pantone™ 102 C) and pink (Pantone™ 672 C), are assigned to the color tiles 31.

In addition to the above, a color information of the color information portion itself is decided. That is to say¥, what Pantone™ color is used for the color information portion 2 is decided. The color of the color information portion 2 may be decided by the computer 8 or the CPU so as that the color of the color information portion is harmonized with the color of the data portion and/or the color of the document affixing the color barcode.

Next, the color information of the data portion and the color information portion is encrypted by the CPU 5 as the color information portion producing device. To encrypt, DES or RC4 etc. encryption method may be used.

Then, the color information portion 2 of the color barcode 1 is produced by the CPU 5 as the color information portion producing device according to the result of the encryption of the color information. In this embodiment, the color information portion 2 is a black and white one-dimension barcode. To produce the color information portion, a software for producing a barcode can be used. In the case that colored color information portion is produced, after producing the color information portion as a grayscale or black and white barcode by using a commercial software for producing a barcode, only color of the barcode can be exchanged from grayscale or black and white to other color in order to produce the colored color information portion.

Also, the digital data which is a base of the data portion 3 is encrypted by the CPU 5 as the data portion producing device. To encrypt, DES or RC4 etc. encryption method may be used.

Then, the data portion 3 of the color barcode 1 is produced by the CPU 5 as the data portion producing device according to the color information decided above and the result of the encryption of the data. The data portion 3 is a second-dimensional color barcode comprising six kind of colors (red (Pantone™ 485 C), orange (Pantone™ 715 C), blue (Pantone™ 285 C), green (Pantone™ 340 C), yellow (Pantone™ 102 C) and pink (Pantone™ 672 C)) of color tiles 31 which are assigned by the Pantone™ color represented by the color information portion 2. To produce the data portion, a software for producing barcode may be used. The color information portion and the data portion may be produced separately by same or different commercial software and be combined later to produce the color barcode comprising the data portion and the color information portion.

The data encrypting step and data portion producing step may be done before, after or at the same time with the color information encrypting step and the color information portion producing step.

By producing the color information portion and the data portion, the color information portion and the data portion are combined and the color barcode is produced.

After that, the color barcode 1 including the color information portion 2 and the data portion 3 is printed on the paper by a printing portion 6 of the color printer 4 according to the result of the color information portion producing step and the result of the data portion producing step. That is to say, the color barcode 1 is printed so as that the color of the data portion and the color information portion is the Pantone™ color represented by the color information portion 2. By doing such, the color barcode as shown in FIG. 1 is produced on the paper.

The color barcode may be affixed not only to the paper, but also to the digital data of the document or the picture as the digital data of the color barcode.

Although the color barcode producing apparatus of this example does not comprise a flat bed image scanner, the color barcode producing apparatus may comprise a scanning device. The scanning device scans the document or picture to be affixed with the color barcode. And the data portion producing device produces the data portion based on the data scanned by the scanning device.

Example 2

Next, the other example of an apparatus for producing the color barcode will be explained as follows.

A color barcode producing apparatus comprises a color information portion storing device, a data portion producing device and a printing device.

As the color barcode producing apparatus, a color printer, such as a laser beam color printer, a thermal color printer such as a sublimation color printer or an ink jet color printer, or a color multi function printer including copying function may be used. In such embodiments, all of the color information portion producing device, a data portion producing device and a printing device are contained in one unit.

On the other hand, as the color barcode producing apparatus, a system including several units connected with each other with or without wire, such as a system including a personal computer and a color printer which are apart and are connected with each other, may be used. The color printer may be a laser beam color printer, a thermal color printer such as a sublimation color printer or an ink jet color printer, or a color multi function printer including copying function.

Next, each element of the color barcode producing device is explained as follows. The color information portion storing device of the color barcode producing apparatus stores a color information portion data of the color information portion in advance. As the color information portion storing device, in the case that the color barcode producing apparatus is a color printer, a memory of the color printer may be comprised. As the color information portion producing device, in the case that the color barcode producing apparatus is a system including a computer and a color printer apart, a memory of the computer or the color printer, a hard disk of the computer, or a external and/or a removable information storing device, such as a CD and/or DVD-ROM and the reproducing device for them of the computer or the color printer may be comprised.

The color information portion data stored in the color information portion storing device includes color information about what Pantone™ colors are used for color tiles of the data portion.

The color information portion storing device may store only one combination pattern of colors which are assigned to the color tiles of the data portion as the one color information portion data. On the other hand, the color information portion storing device may store several combination patterns of colors which are assigned to the color tiles of the data portion as the several color information portion data.

In the case that the color information portion storing device stores several color information portion data, an user may be able to choose the color used for the barcode by selecting color information portion data, or the color information portion may be decided automatically according to the result of an analysis of a color tone or shade of a document affixing the color barcode so that the color of the data portion harmonizes with the color of the document.

Therefore, the color barcode producing apparatus may comprise a color information selecting device in order to choose the color information portion data among the several color information portion data stored in the color information portion storing device, such as a input button of the color printer or a keyboard of the computer.

Also, the color barcode producing apparatus may comprise a color information deciding device in order to automatically decide the color information portion data among the several color information portion data stored in the color information portion storing device according to the result of an analysis of a color tone or shade of a document affixing the color barcode, such as an IC or a CPU of the color printer or the computer, if necessary in combination with a software.

Regarding the data portion producing device, it is similar to that of the Example 1 except that the data portion producing device produces the data portion according to the color information portion data stored in the color information portion storing device.

Regarding the printing device, it is similar to that of the Example 1 except that the printing device prints the color barcode according to the color information portion data stored in the color information portion storing device.

Using the color barcode producing apparatus of this example, the color barcode is produced as follows.

A method for producing a color barcode comprises an data encrypting step which encrypts data, a data portion producing step which produces a data portion according to the color information stored in advance and the result of the encrypting step of the data, and a printing step which prints the color barcode including the color information portion and the data portion according to the color information stored in advance and the results of the producing step of the data portion. In the case that the color information portion of the color barcode is fixed or selected among only a few choices, the above method may be used.

In the following, the detailed description of one of embodiments of the above method will be explained, referring to FIG. 2.

In FIG. 2, a color printer 4 is shown as the color barcode producing apparatus for the above method. In this embodiment, a computer 8 is connected with the color printer 4. The computer 8 is conencter with a flat bed image scanner 9.

At first, a document or a picture including information which is to be recorded in the data portion of the color barcode is scanned by the flat bed image scanner 9 and is changed into a digital data which is a base of the data portion 3 of the color barcode 1. Alternatively, to get a data which is a base of the data portion 3, some digital data, such as a data recorded in CD-ROM, DVD-ROM or a hard disk or a digital data sent via a network, may be reproduced by the computer 4.

Next, in the case that a memory 7 as the color information portion storing device stores several color information portion data, colors to be assigned to the color tiles 31 of the data portion 3 is decided among the several color information portion data. To select the color information portion data, the document on which the barcode is affixed is scanned by the flat bed image scanner 9 or read by the computer 8. And the data of the document, which may be the digital data being a base of the data portion, is analyzed by the computer 8 or the CPU 5 of the color printer 4. Then, the shade or tone of colors of the data of the document is decided by the computer 8 or the CPU 5 of the color printer 4, and one of the color information portion data representing a combination pattern of colors to be assigned to the color tiles is selected among the several color information portion data stored in the memory 7 by the CPU 5 as the color information deciding device so as that the colors to be assigned to the color tiles 31 are harmonious with the colors of the document affixing the color barcode.

Or, as the other way, user can choose the color combination pattern as the color information portion data among several color information portion data by an input button (not disclosed in FIG. 2) of the color printer 4 as the color information selecting device.

By deciding the color information portion data, the color information is decided. That is to say, what Pantone™ colors are used for color tiles 31 of the data portion 3 of the color barcode 1 is decided. In this example, red (Pantone™ 485 C), orange (Pantone™ 715 C), blue (Pantone™ 285 C), green (Pantone™ 340 C), yellow (Pantone™ 102 C) and pink (Pantone™ 672 C) are assigned to the color tiles 31.

In addition to the above, because a color information of a color information portion itself is included in the color information portion data, a color information of the color information portion itself is decided. That is to say, what Pantone™ color is used for the color information portion 2 is decided.

In the case that the memory 7 as the color information portion storing device stores only one color combination pattern as the color information portion data including the color information of the data portion and the color information portion itself, the process described in the previous four paragraphs are omitted.

In this embodiment, the color information portion 2 is a black and white one-dimension barcode.

Also, the digital data which is a base of the data portion 3 is encrypted by the CPU 5 as the data portion producing device. To encrypt, DES or RC4 etc. encryption method may be used.

Then, the data portion 3 of the color barcode 1 is produced by the CPU 5 as the data portion producing device according to the color information stored in the memory 7 and the result of the encryption of the data. The data portion 3 is a second-dimensional color barcode comprising six kind of colors (red (Pantone™ 485 C), orange (Pantone™ 715 C), blue (Pantone 285™ C), green (Pantone™ 340 C), yellow (Pantone™ 102 C) and pink (Pantone™ 672 C)) of color tiles 31 which are assigned by the Pantone™ colors represented by the color information portion 2.

By deciding or reproducing the color information portion and producing the data portion and combining the color information portion and the data portion, the color barcode is decided.

After that, the color barcode 1 including the color information portion 2 and the data portion 3 is printed on the paper by a printing portion 6 of the color printer 4 according to the color information portion stored in the memory 7 and the result of the data portion producing step. Namely, the color barcode 1 is printed so as that the color of the data portion and the color information portion is the Pantone™ color represented by the color information portion 2. By doing such, the color barcode as shown in FIG. 1 is produced on the paper.

The color barcode may be affixed to not only to the paper, but also the digital data of the document or the picture as the digital data of the color barcode.

Example 3

In the examples 1 and 2, the examples of the apparatus and method of producing the color barcode are explained. In the following, the example of an apparatus and a method for reproducing the color barcode will be explained.

A color barcode reproducing apparatus comprises a scanning device, a retrieving device, a relating device and a printing device.

As such color barcode reproducing apparatus, a color copying machine or a color multi function printer including copying function may be used. In such embodiment, all of the scanning device, the retrieving device, the relating device and the printing device are contained in one unit.

On the other hand, as such color barcode reproducing apparatus, a system including several units connected with each other with or without wire, such as a system including a personal computer, an image scanner and a color printer which are apart and are connected with each other, may be used. The color printer may be a laser beam color printer, a thermal color printer such as a sublimation color printer or an ink jet color printer, or a color multi function printer including copying function.

Next, each element of the color barcode reproducing apparatus is explained as follows.

The scanning device scans the color information portion of the color barcode and the data portion of the color barcode. As the scanning device, in the case that the color barcode reproducing apparatus is the color copying machine or the color multi function printer including copying function, a scanning portion of the color copying machine or the multi function color printer may be comprised. As the scanning device, in the case that the color barcode reproducing apparatus is a system including a computer, an image scanner and a color printer apart, an image scanner such as a flat bed scanner may be comprised.

The retrieving device retrieves the color information of the color barcode by decrypting a data obtained from the scanned color information portion. As the retrieving device, in the case that the color barcode reproducing apparatus is the color copying machine or the color multi function printer, an IC or a CPU of the color copying machine or the color multi function printer may be comprised, if necessary in combination with a software. As the retrieving device, in the case that the color barcode reproducing apparatus is a system including a computer, an image scanner and a color printer apart, an IC or a CPU of the computer or the image scanner may be comprised, if necessary in combination with a software The relating device relates each color of the color tiles of the data portion scanned by the scanning device to each color of the color information retrieved by the retrieving device. As the relating device, in the case that the color barcode reproducing apparatus is the color copying machine or the color multi function printer, an IC or a CPU of the color copying machine or the color multi function printer may be comprised, if necessary in combination with a software. As the relating device, in the case that the color barcode reproducing apparatus is a system including a computer, an image scanner and a color printer apart, an IC or a CPU of the computer or the image scanner may be comprised, if necessary in combination with a software.

The printing device prints the color barcode including the color information portion and the data portion with the color according to the result of the retrieving device and the relating device. As the printing device, in the case that the color barcode reproducing apparatus is the color copying machine or the color multi function printer, a printing portion of the color copying machine or the multi function color printer may be comprised. As the printing device, in the case that the color barcode reproducing apparatus is a system including a computer, an image scanner and a color printer apart, the color printer may be comprised.

The color barcode reproducing apparatus may comprise a color barcode data storing device which stores a data of the color barcode scanned by the scanning device and a data obtained from the scanned color information portion by retrieving step of the retrieving device and a data obtained from a result of the relating step by the relating device. As the color barcode data storing device, in the case that the color barcode reproducing apparatus is the color copying machine or the color multi function printer, a memory of the color copying machine or the multi function color printer may be comprised. As the color barcode data storing device, in the case that the color barcode reproducing apparatus is a system including a computer, an image scanner and a color printer apart, a memory of the computer or the color printer, a hard disk of the computer, or a external and/or a removable information storing device, such as a CD and/or DVD-ROM and the reproducing device for them of the computer may be comprised.

Using the color barcode reproducing apparatus of this example, the color barcode is reproduced as follows.

A method for reproducing a color barcode comprises a color information portion scanning step which scans the color information portion of the color barcode, a retrieving step which retrieves the color information by decrypting the scanned color information portion, a data portion scanning step which scans the data portion, a relating step which relates each color of the color tiles of the scanned data portion to each color of the color information retrieved by the retrieving step, and a printing step which prints the color barcode including the color information portion and the data portion with the color according to the result of the relating step.

In the following, the detailed description of one of embodiments of the above method will be explained, referring to FIG. 3.

Figure 3:
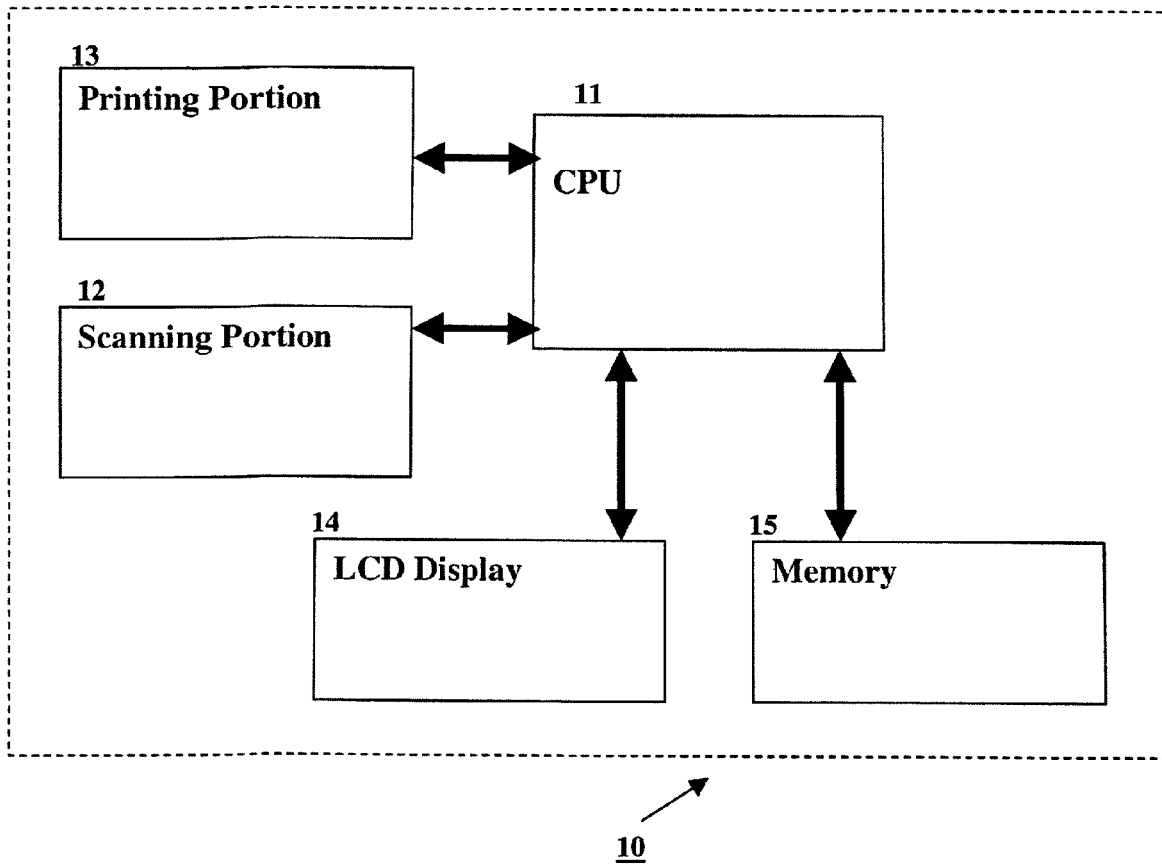
FIG. 3 is a block diagram of a color barcode reproducing apparatus as one of embodiment of the present invention.

In FIG. 3, a color multifunction printer including copying function 10 is shown as the color barcode reproducing apparatus for the above method.

At first, a paper, a sheet, a document or a book etc. affixing a color barcode 1 comprising a color information portion 2 and a data portion 3 including several color tiles 31 is scanned by the scanning portion 12, which is the scanning device, of the color multifunction printer 10 and the color barcode is changed into a digital data. Alternatively, to get a digital data of the color barcode, some digital data, such as a data recorded in CD-ROM, DVD-ROM or a hard disk or a digital data sent via a network, may be read by a computer (not disclosed in FIG. 3) connected with the color multifunction printer 10 and sent from the computer to the multifunction printer 10. As stated in the above, usually the color information portion scanning step and the data portion scanning step is done simultaneously.

Next, in the retrieving step, a data of the color barcode, especially a data of the color information portion and the data portion, is extracted from the scanned, reproduced or sent digital data. And the data of the color information portion is decrypted by a CPU 11 of the color multifunction printer 10 as the retrieving device in order to obtain a color information. To decrypt, DES or RC4 etc. decryption method may be used. By this step, the information about what Pantone™ colors are used for the color tiles 31 of the data portion 3 can be retrieved. The retrieved color information may be stored in a memory 15 as the color barcode data storing device.

Then, in the relating step, each color of the color tiles 31 of the scanned data portion 3 is related by CPU 11 as the relating device to each color of the color information retrieved by the retrieving step. At first, data portion is extracted from the data of the scanned document and each color used in color tiles 31 is retrieved and analyzed. Then, each color of the color tiles 31 is related by CPU 11 to the same color of Pantone™ color represented in the color information portion. For example, if color of one color tile is blue (Pantone™ 285C) and Pantone™ 285C is included in the color information of the color information portion, the blue of color tile is related to Pantone™ 285 C of the color information. If there is no same color of certain color tile in the color of the color information, among several Pantone™ colors represented in the color information portion, the closest Pantone™ color of the color information is related to the color of the color tiles. For example, if color of one color tile is blue (Pantone™ 2925C), and red (Pantone™ 485 C), orange (Pantone™ 715 C), blue (Pantone™ 285 C), green (Pantone™ 340 C), yellow (Pantone™ 102 C) and pink (Pantone™ 672 C) are included in the color information of the color information portion, the blue (Pantone™ 2925C) of color tile is related to Pantone™ 285 C of the color information because Pantone™ 285C is the closest color. When all colors of color tiles 31 are related to colors of the color information represented by the color information portion, the relating step is completed. In other words, all colors of color tiles are regarded as Pantone™ colors represented by the color information portion. However, if one or some colors of the color tiles 31 are too different with the color of the color information, the relating step cannot be completed. In such case, a LCD display 14 of the color multifunction printer 10 displays warning message such as "this color barcode cannot be reproduced".

After relating step, according to the result of the relating step, the Pantone™ colors used for printing the color barcode are decided. Then, according to the decided colors, the color barcode 1 including the color information portion 2 and the data portion 3 is printed on the paper by a printing portion 13, which is the printing device, of the color multifunction printer 10 so as that the color of the color tiles 31 of the printed data portion 3 on the paper accords with the Pantone™ color represented by the color information portion 2 of the color barcode 1. For example, if color of one color tile of printed original color barcode is blue (Pantone™ 2925C), and red (Pantone 485 C), orange (Pantone 715 C), blue (Pantone™ 285 C), green (Pantone™ 340 C), yellow (Pantone™ 102 C) and pink (Pantone™ 672 C) are included in the color information of the color information portion, Pantone™ 285 C is printed in the color tile corresponding to the color tile of which color is blue (Pantone™ 2925C) in the printed original color barcode.

By doing such, integrity and authenticity of the color barcode can be maintained even if the color barcode is copied or reprinted.

The color barcode may be affixed not only to the paper, but also to the digital data of the document or the picture as the digital data of the color barcode.

Example 4

The color barcode produced or reproduced by the way shown in the examples 1, 2 and 3 is read in order to obtain a data from the color barcode. In the following, the example of an apparatus and a method for reading the color barcode will be explained.

A color barcode reading apparatus comprises a scanning device, a retrieving device and a relating device.

As such color barcode reading apparatus, a color barcode reader, a color copying machine or a color multi function printer including copying function may be used. In such embodiment, all of the scanning device, the retrieving device and the relating device are contained in one unit.

On the other hand, as such color barcode reading apparatus, a system including several units connected with each other with or without wire, such as a system including a personal computer and an image scanner which are apart and are connected with each other, may be used.

Next, each element of the color barcode reading apparatus is explained as follows.

Regarding the scanning device, it is similar to that of the Example 3 except that the scanning device may include a scanning portion of the color barcode reader.

The retrieving device retrieves the color information of the color barcode by decrypting a data obtained from the scanned color information portion. As the retrieving device, in the case that the color barcode reading apparatus is the color barcode reader, the color copying machine or the color multi function printer, an IC or a CPU of the color barcode reader, the color copying machine or the color multi function printer may be comprised, if necessary in combination with a software. As the retrieving device, in the case that the color barcode reading apparatus is a system including a computer and an image scanner, an IC or a CPU of the computer or the image scanner may be comprised, if necessary in combination with a software.

Further, the retrieving device retrieves the data by decrypting the scanned data portion according to the results of the relating device and the color information retrieved by the retrieving device. Regarding the relating device, it is explained below.

Regarding the relating device, it is similar to that of the Example 3 except that the relating device may include an IC or a CPU of the color barcode reader.

The color barcode reproducing apparatus may comprise a color barcode data storing device. Regarding the color barcode data storing device, it is similar to that of the Example 3 except that the color barcode data storing device may store the data obtained from the scanned data portion by retrieving step of the retrieving device.

Using the color barcode reading apparatus of this example, the color barcode is read as follows.

A method for reading a color barcode comprises a color information portion scanning step which scans the color information portion of the color barcode, a retrieving step which retrieves the color information by decrypting the scanned color information portion, a data portion scanning step which scans the data portion, a relating step which relates each color of the color tiles of the scanned data portion to each color of the color information retrieved by the retrieving step, and a retrieving step which retrieves the data by decrypting the scanned data portion according to the result of the relating step and the color information retrieved.

In the following, the detailed description of one of embodiments of the above method will be explained, referring to FIG. 4.

Figure 4:
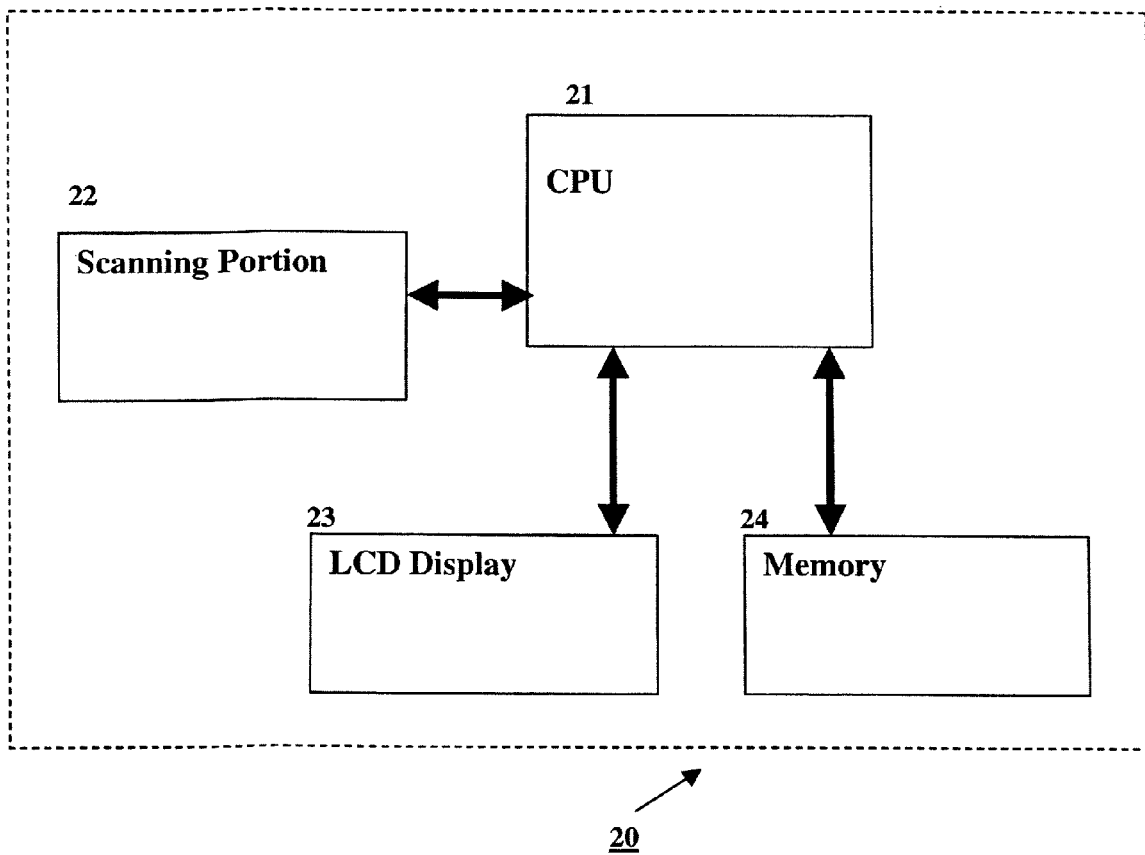
FIG. 4 is a block diagram of a color barcode reading apparatus as one of embodiment of the present invention.

In FIG. 4, a color barcode reader including 20 is shown as the color barcode reading apparatus for the above method.

At first, the color barcode affixed on a paper, a sheet, a document or a book etc. is scanned by the scanning portion 22, which is the scanning device, of the color barcode reader 10 and the color barcode is changed into a digital data. Alternatively, to get a digital data of the color barcode, some digital data, such as a data recorded in CD-ROM, DVD-ROM or a hard disk or a digital data sent via a network, may be read by a computer (not disclosed in FIG. 4) connected with the color barcode reader 20 and sent from the computer to the color barcode reader 20. As stated in the above, usually the color information portion scanning step and the data portion scanning step is done simultaneously.

Next, in the retrieving step, the data of the color information portion is decrypted by a CPU 21 of the color barcode reader 20 as the retrieving device in order to obtain a color information. To decrypt, DES or RC4 etc. decryption method may be used. By this step, the information about what Pantone™ colors are used for the color tiles 31 of the data portion 3 can be retrieved. The retrieved color information may be stored in a memory 24 as the color barcode data storing device.

Then, in the relating step, each color of the color tiles 31 of the scanned data portion 3 is related by CPU 21 as the relating device to each color of the color information retrieved by the retrieving step. At first, each color used in color tiles 31 is retrieved and analyzed. Then, each color of the color tiles 31 is related by CPU 21 to the same color of Pantone™ color represented in the color information portion. For example, if color of one color tile is blue (Pantone™ 285C) and Pantone 285C™ is included in the color information of the color information portion, the blue of color tile is related to Pantone™ 285 C of the color information. If there is no same color of certain color tile in the color of the color information, among several Pantone™ colors represented in the color information portion, the closest Pantone™ color of the color information is related to the color of the color tiles. For example, if color of one color tile is blue (Pantone 2925C), and red (Pantone™ 485 C), orange (Pantone™ 715 C), blue (Pantone™ 285 C), green (Pantone™ 340 C), yellow (Pantone™ 102 C) and pink (Pantone™ 672 C) are included in the color information of the color information portion, the blue (Pantone™ 2925C) of color tile is related to Pantone™ 285 C of the color information because Pantone™ 285C is the closest color. When all colors of color tiles 31 are related to colors of the color information represented by the color information portion, the relating step is completed. In other words, all colors of color tiles are regarded as Pantone™ colors represented by the color information portion. However, if one or some colors of the color tiles 31 are too different with the color of the color information, the relating step cannot be completed. In such case, a LCD display 23 of the color barcode reader 20 displays warning message such as "this color barcode cannot be read".

Then, the data of the data portion is retrieved by decrypting the scanned data portion according to the result of the relating step and the color information retrieved by CPU 21 as the retrieving device in order to obtain data recorded in the data portion. In this retrieving step, the colors of the data portion of printed color barcode are regarded as the Pantone™ colors represented by the color information portion according to the result of the relating step. To decrypt, DES or RC4 etc. decryption method may be used. The retrieved data may be stored in a memory 24 as the color barcode data storing device.

For example, if color of one color tile of printed original color barcode is blue (Pantone™ 2925C), and red (Pantone™ 485 C), orange (Pantone™ 715 C), blue (Pantone™ 285 C), green (Pantone™ 340 C), yellow (Pantone™ 102 C) and pink (Pantone™ 672 C) are included in the color information of the color information portion, the blue (Pantone™ 2925C) of the printed color tile is regarded as Pantone™ 285 C and read as Pantone™ 285C according to the result of the relating step.

By doing such, integrity and authenticity of the color barcode can be maintained even if the color barcode deteriorates or is copied or reprinted.

On the other hand, the color barcode produced or reproduced by the way of the above example may be read by the method including only scanning step and retrieving step for the data portion without the retrieving step for the color information portion and the relating portion.

Disclosed embodiments can be varied by a skilled person without departing from the spirit and scope of the invention.

What is claimed is:

1. A computer-implemented method for reproducing a first color barcode, comprising:

scanning a first color information portion, which is a part of the first color barcode, wherein the first color information portion includes an encoding of at least one color value, wherein each of the at least one color values corresponds to at least one color used in at least one of a plurality of first color tiles present in a first data portion of the first color barcode, retrieving the at least one color value by decoding the scanned first color information portion, scanning the first data portion, which is a part of the first color barcode and includes the plurality of first color tiles, wherein the plurality of first color tiles encode data associated with the first color barcode, correlating the at least one retrieved color value with at least one color associated with the plurality of first color tiles in the first data portion, and printing a second color barcode including a second color information portion, wherein the second color information portion includes an encoding of the at least one retrieved color value, and a second data portion including at least one second color tile, wherein the color of the at least one second color tile corresponds to the color associated with the retrieved color value.

2. The method for reproducing color barcode of claim 1, wherein the color information includes a definition of the color in at least one of a color sample system and a color space.

3. A color barcode reproducing apparatus, comprising:

a scanning device, which scans:

a first color information portion, which is a part of a first color barcode, wherein the first color information portion includes an encoding of at least one color value, wherein each of the at least one color values corresponds to at least one color used in at least one of a plurality of first color tiles present in a first data portion of the first color barcode, and the first data portion, which is a part of the first color barcode, wherein the first data portion includes a plurality of first color tiles encode data associated with the first color barcode;

a retrieving device, which retrieves the at least one color value by decoding the scanned first color information portion, a correlating device, which correlates the at least one retrieved color value with at least one color associated with at least one of the plurality of first color tiles of the first data portion, and a printing device, which prints a second color barcode including a second color information portion, wherein the second color information portion includes an encoding of the at least one retrieved color value, and a second data portion including at least one second color tile, wherein the color of the at least one second color tile corresponds to the color associated with retrieved color value.

4. The color barcode producing apparatus of claim 3, wherein the color information includes a definition of the color in at least one of a color sample system and a color space.

\* \* \* \* \*